US005925426A

United States Patent [19]

Galerneau

[11] Patent Number: 5,925,426

[45] Date of Patent: Jul. 20, 1999

[54] ORNAMENT

[75] Inventor: Stéphane Galerneau, Paris, France

[73] Assignee: Porcelaines Philippe Deshoulieres-Lourioux S.A., Foecy, France

[21] Appl. No.: 08/835,111

[22] Filed: Apr. 4, 1997

[51] Int. Cl.$^{6}$ .......... B32B 1/00

[52] U.S. Cl. .......... 428/34.1; 428/11; 428/34.4; 428/36.9; D26/128

[58] Field of Search .......... 428/11, 34.4, 34.1, 428/36.9; 362/363, 806; D26/128

[56] References Cited

U.S. PATENT DOCUMENTS 1,481,719 1/1924 Lui .......... 362/363
4,300,887 11/1981 Riemer .......... 428/11
5,404,285 4/1995 Schonbek .......... 362/363

*Primary Examiner*—Alexander Thomas
*Attorney, Agent, or Firm*—Michael R. Gilman; Kaplan & Gilman LLP

[57] ABSTRACT

An improved porcelain ornament imprinted through the method of lithophanie is provided. The ornament comprises a lower body element having a design imprinted thereon through the method of lithophanie, and an upper body element having a second design printed thereon, also through the method of lithophanie. The upper body element is selectively removable from the lower body element for insertion of a light producing element. When the upper and lower body elements are combined, the upper and lower designs interactively form one overall picture.

4 Claims, 1 Drawing Sheet

ORNAMENT

BACKGROUND OF THE INVENTION

The invention relates to the field of ornaments, and more particularly, to porcelain ornaments using the lithophanie art of placing a design on the ornament.

Ornaments are old in the art, as are ornaments made of porcelain. It is also old in the art to imprint porcelain with a design in a manner known as lithophanie, where lithophanie is defined as a type of ornamentation of porcelain which is visible when held to light, and is produced by pressing designs into the porcelain when it is soft.

These prior art lithophanies fail to provide for internal lighting of the item so that the design on the porcelain could be illuminated from within and thereby seen more easily from the outside.

Accordingly, it would be desirable to provide an ornament made of porcelain and having a design imprinted thereon by the method of lithophanie, which is able to contain therein a lighting element for internal illumination of the design.

SUMMARY OF THE INVENTION

In accordance with the invention, an improved porcelain ornament imprinted through the method of lithophanie is provided. The ornament comprises a lower body element having a design imprinted thereon through the method of lithophanie, and an upper body element having a second design printed thereon, also through the method of lithophanie. The upper body element is removable from the lower body element for insertion of a light producing element, and when the upper and lower elements are combined, the upper and lower designs interactively form one overall picture.

Accordingly, it is an object of the invention to provide an improved ornament.

Still another object of the invention is to provide an improved ornament made of porcelain and imprinted by the method of lithophanie.

Yet another object of the invention is to provide an improved spherical porcelain ornament comprised of an upper and a lower element which are selectively separable for insertion of a light producing element.

Other objects of the invention will in part be obvious and will in part be apparent from the following description.

The invention accordingly comprises the assembly possessing the features, properties and relation of components which will be exemplified in the product hereinafter described, and the scope of the invention will be dictated in the claims.

BRIEF DESCRIPTION OF THE DRAWING

For a fuller understanding of the invention, reference is made to the following description taken in connection with the accompanying drawings, in which.

DETAILED DESCRIPTION OF THE PREFERRED EMBODIMENT

Figure 1:
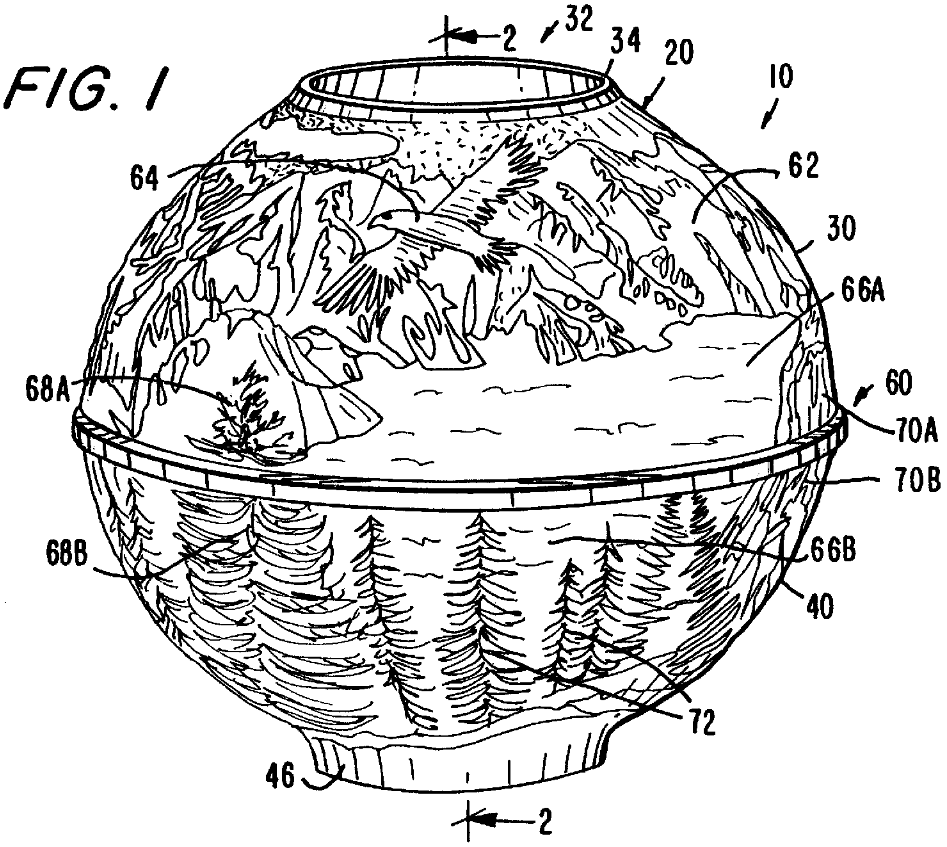
FIG. 1 is a perspective view of a spherical porcelain ornament imprinted through the method of lithophanie, comprising two hemispherical, selectively separable elements, each having half of the overall picture of the design.

Referring to the figures, a porcelain ornament imprinted with a design through the method of lithophanie and generally designated at 10 is shown. Porcelain ornament 10 includes ornament 20 having an upper hemispherical element 30, a lower hemispherical element 40 and a light producing element 50. Elements 30 and 40 are preferable made of porcelain, while light producing element 50 is preferably a candle of some type. It is, however, understood that elements 30 and 40 could be made in any shape and of other materials, such as glass, and that light producing element 50 can be electrical in nature.

Element 30 has an opening 32 defined by a rim 34, extending therethrough. Opening 32 allows for light from light producing element 50 to exit ornament 20 with full energy, as opposed to having to translate through the sides of ornament 20, thereby losing energy. Opening 32 also allows for the exiting from the interior of ornament 20 of any aroma, whether scented or not, produced through the burning of light producing element 50, when light producing element 50 is a candle.

Opening 32 is shown to be located so as to have its center along what can be defined as the north pole of the spherically shaped ornament 20. It is understood, however, that opening 32 can be located anywhere on ornament 20, and that opening 32 can be any size, shape and number of openings.

Hemispherical element 30 has a portion of a picture imprinted therein through the method of lithophanie, as shown at 60. Picture 60 has a mountain range 62, a bird 64, a first lake 66A, the top of a tree 68A and a lake surrounding portion 70A. The combination of element 62, 64, 66A, 68A and 70A all combine to make a part of picture 60.

Lower hemispherical element 40 also has a portion of picture 60 thereon. In this case, however, element 40 has trees 72, a second lake 66B, a lower portion of a tree 68B and a lake surrounding portion 70B. The combination of elements 72, 66B, 68B and 70B all combine to make another part of picture 60.

As is seen in FIG. 1, when ornament 20 is in its assembled condition, showing a full sphere, elements 66A, 68A and 70A of picture 60 combine with elements 66B, 68B and 70B, also of picture 60, to create an overall design.

Figure 2:
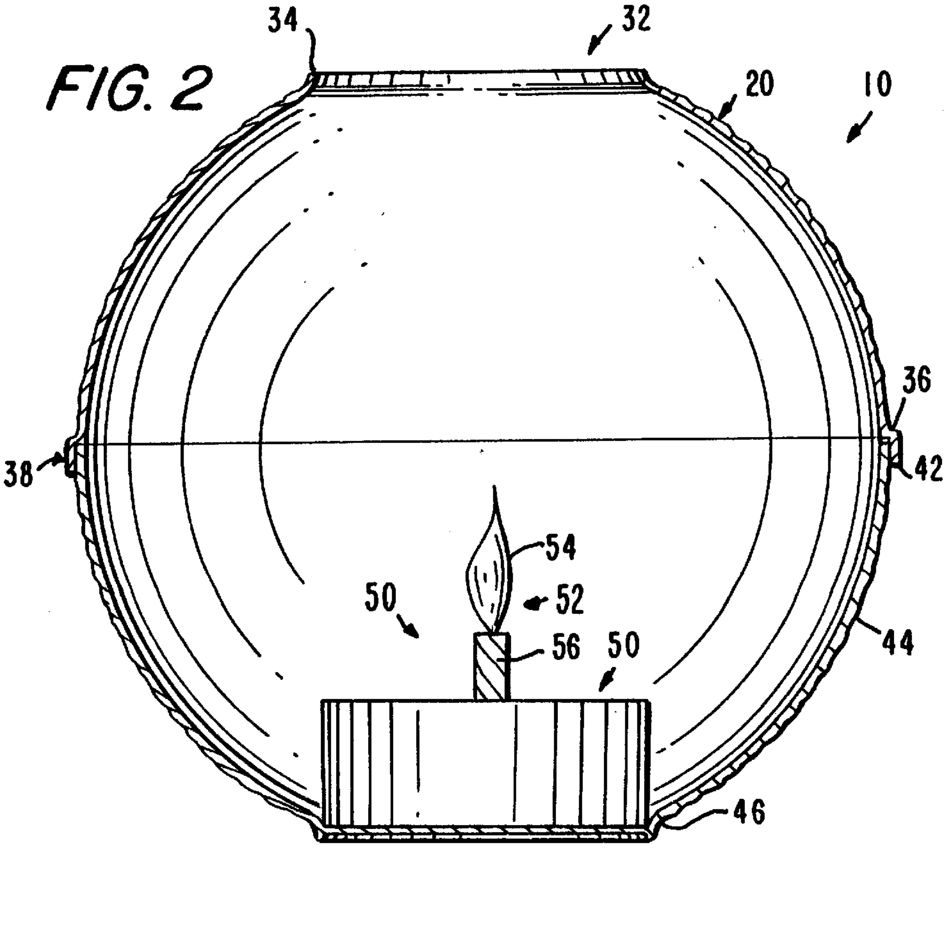
FIG. 2 is a cross-sectional view taken along line 2—2 of FIG. 1.

Turning to FIG. 2, it is seen that upper hemispherical element 30 has a ridge 36 which abuts against and rests upon ridge 42 of lower hemispherical element 40. In order to maintain upper hemispherical element 30 on lower hemispherical element 40, without element 30 sliding off of element 40, element 30 has a ridge cap 38 extending outward from ridge 36, and around a portion of outside surface 44 of element 40 when rims 36 and 42 abut. It is to be understood from the invention that ridge cap 38, instead of extending from element 30, could instead extend from element 40 in the opposite direction of that as shown in FIG. 2.

As seen in the figures, element 40 has a stand 46 extending outwardly from element 40 in a position substantially opposite to opening 32. On the inside of stand 46, as seen in FIG. 2, stand 46 has a substantially flat receiving surface for receipt thereon of lighting element 50. Lighting element 50, in the preferred embodiment, is a candle 52 having a flame 54 and a lower wax member 56.

As has been discussed, lighting element 50 can instead be an electrical lighting element.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

What is claimed is:

1. An ornament, comprising:

a lower body element having a first design thereon, and a second ridge defining an upper edge of said lower body element;

an upper body element having a second design thereon, and a first ridge defining a lower edge of said upper body element, wherein said first ridge of said upper body element is selectively removably abutingly received onto said second ridge of said lower body element, so that a unitary picture or design is formed by the interaction of said first and second designs when said first ridge of said upper body element is selectively removably abutingly received onto said second ridge of said lower body element;

a continuous ridge cap extending from said lower body element at, and continuously adjacent to, said second ridge of said lower body element, wherein an inside wall surface of said continuous ridge cap substantially abuts against a continuous portion of an outside surface of said upper body element at, and substantially adjacent to, said first ridge of said upper body element, when said first ridge of said upper body element is selectively removably abutingly received onto said second ridge of said lower body element; and a stand in combination with and extending from said lower body element in a location opposite said second ridge of said lower body element.

2. An ornament as recited in claim 1, said upper body element having at least one opening extending therethrough to allow for light and any aroma from a light producing element to exit said ornament.

3. An ornament as recited in claim 1, wherein said stand has an inside surface for receiving thereon a light producing element.

4. An ornament as recited in claim 3, said stand for supporting said ornament on a substantially horizontal surface.

* * * * *